United States Patent [19]
Jackson

[11] 3,871,621
[45] Mar. 18, 1975

[54] CABLE CHUTE

[75] Inventor: Richard L. Jackson, Lewisburg, Ohio

[73] Assignee: Jackson Communication Corporation, Clayton, Ohio

[22] Filed: Sept. 21, 1973

[21] Appl. No.: 399,550

[52] U.S. Cl. .................. 254/134.3 PA, 254/190 R
[51] Int. Cl. .......................................... E21c 29/16
[58] Field of Search ........... 254/134.3 R, 134.3 PA, 254/190 R

[56] References Cited
UNITED STATES PATENTS

| | | | |
|---|---|---|---|
| 2,629,768 | 2/1953 | Beil | 254/134.3 R |
| 2,938,678 | 5/1960 | Hrovat | 254/134.3 PA |
| 3,042,374 | 7/1962 | Livingston | 254/134.3 R |
| 3,103,345 | 9/1963 | Eitel | 254/190 R |
| 3,110,479 | 11/1963 | Eitel | 254/134.3 R |
| 3,172,642 | 3/1965 | Eitel | 254/134.3 R |

Primary Examiner—Al Lawrence Smith
Assistant Examiner—Robert C. Watson
Attorney, Agent, or Firm—Biebel, French & Bugg

[57] ABSTRACT

A cable chute adapted to guide into position beneath an existing messenger strand a plurality of cables which are to be permanently suspended from the messenger strand. The cable chute is designed to permit simultaneous handling of several cables, such as relatively fragile coaxial cables, without damaging the cables through inter cable contact. Additionally, the chute is self-aligning about both horizontal and vertical axes to compensate for variations in the position of the cable reel with respect to direction and elevation of the existing messenger cable.

13 Claims, 13 Drawing Figures

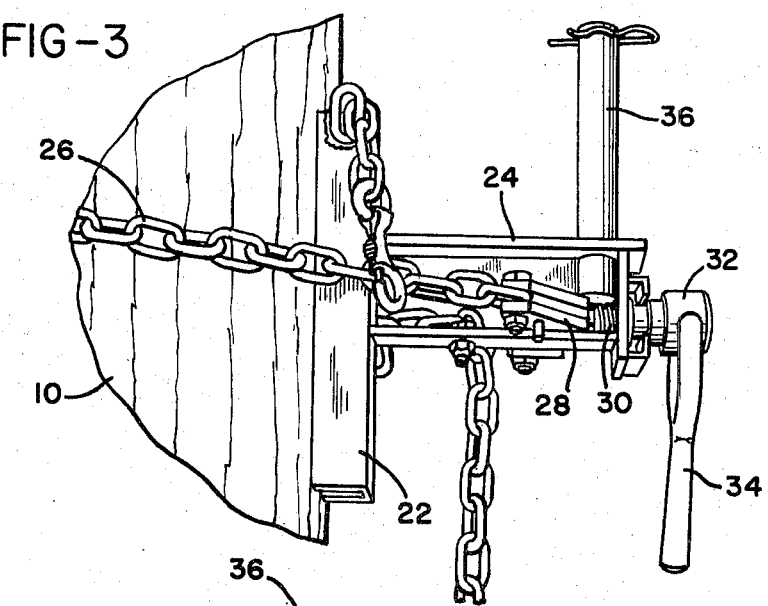
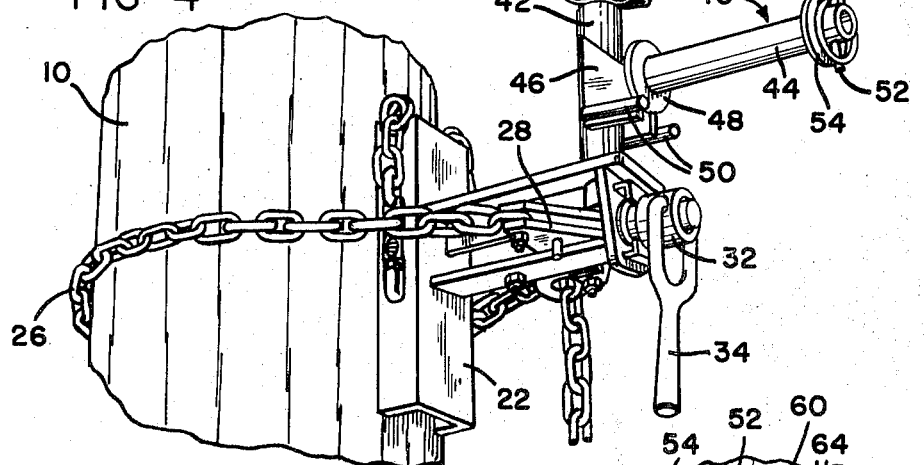
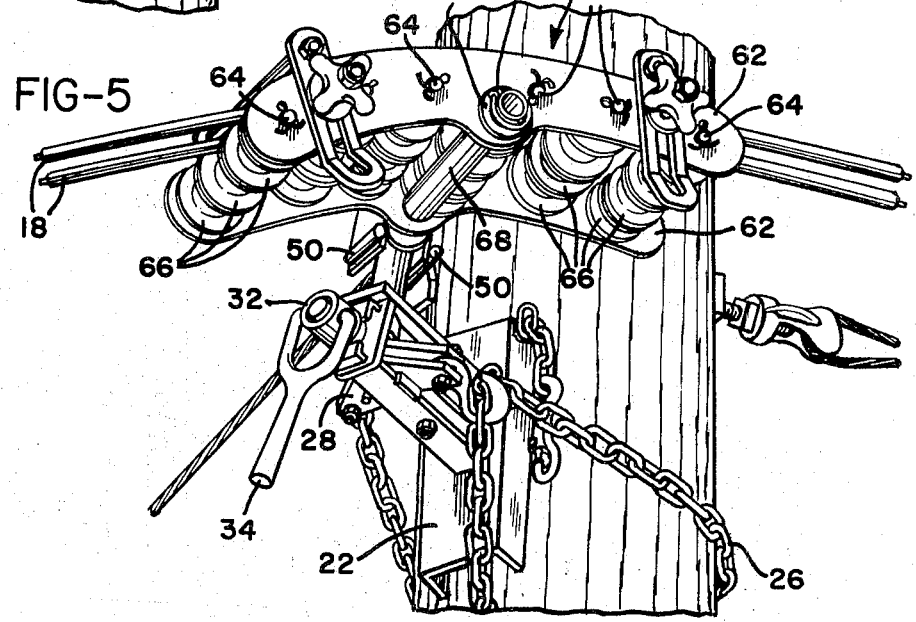

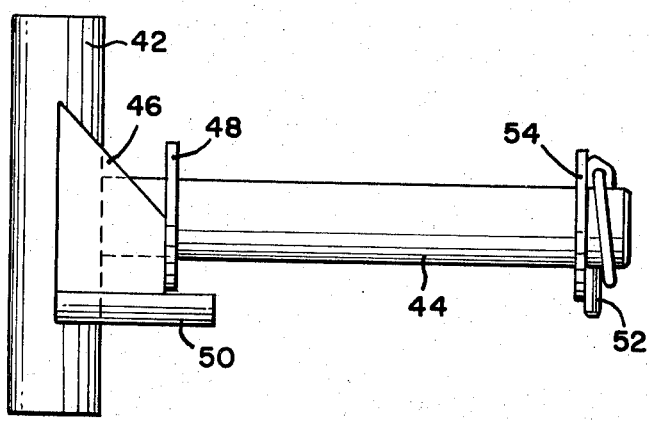
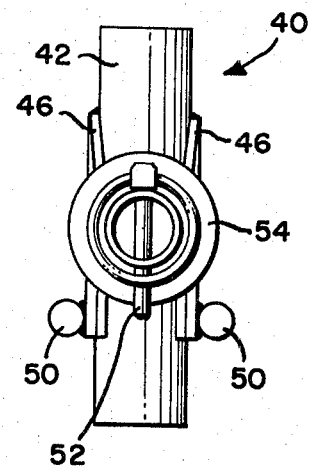
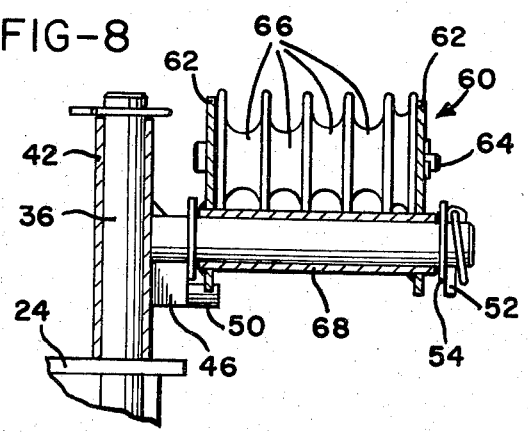
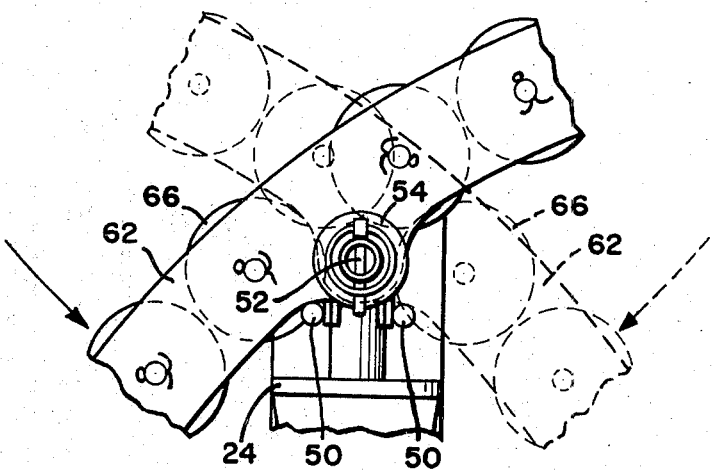

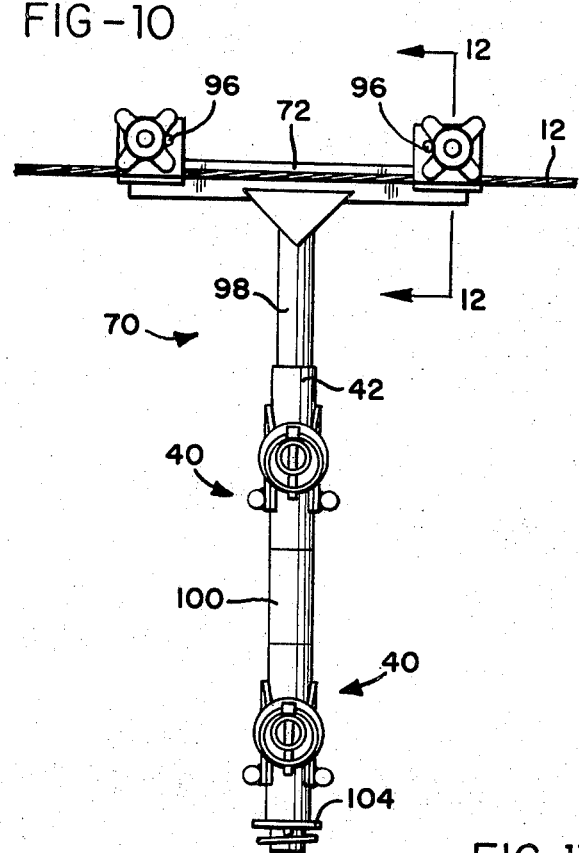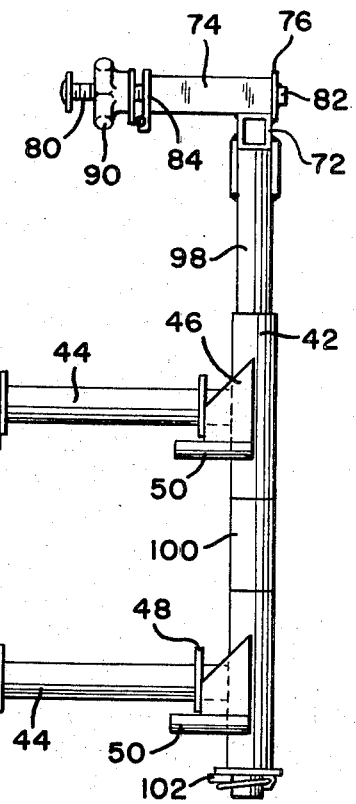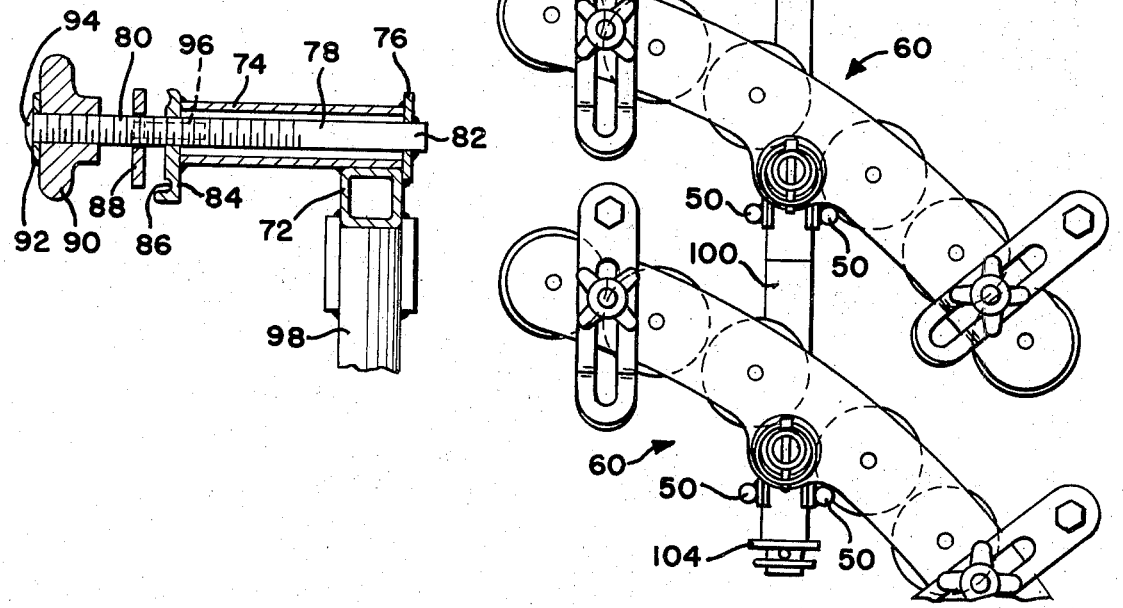

CABLE CHUTE

BACKGROUND OF THE INVENTION

In conventional cable stringing operations a cable guide is generally provided to direct cable from a reel located on the ground upwardly to a position beneath an existing messenger strand extending between a series of supporting poles. For example, U.S. Pat. Nos. 3,172,642 and 3,185,444 disclose cable guides designed for this general purpose. Additionally, U.S. Pat. No. 3,110,479 discloses a pole mounted guide for guiding cables around supporting poles.

In order to avoid cable damage, particularly when dealing with relatively fragile cables such as coaxial cables, the cable guide must be designed such that the cables are not subjected to severe or sharp bends as they are moved into position beneath the messenger strand and also care must be taken to prevent damage to the cables through inter cable contact when several cables are being guided into position simultaneously.

While existing cable stringing equipment often functions satisfactorily with relatively more rugged cables, such as telephone and telegraph lines and electrical power transmission lines, much of this equipment is not adapted to satisfactorily handle the more fragile coaxial cables, even though in most cases an attempt is in fact made to use existing cable stringing equipment for stringing coaxial cables.

For example, it is generally acceptable to train a series of electrical power transmission lines about a single grooved pulley, since the action of the cables rubbing against each other and crossing over each other as they are trained about the pulley does not seriously effect their subsequent operation. Additionally, where as is often the case, the reel or reels from which the cables are being unrolled is not aligned with the messenger strand beneath which the cables are to be strung or if the angle from the reel to the point to which the cables are being led to the messenger strand is fairly steep, the physical characteristics of, for example, electrical transmission lines, are such that they will generally not experience any significant damage.

While it would seem to be a simple matter to position properly the cable reel with respect to the messenger strand, as a practical matter there will often be obstructions on the ground or other considerations which necessitate positioning the cable reel in other than the optimum position with respect to the messenger strand. This can result in fairly sharp bends being induced in the cables as they are guided using conventional guides into position beneath the messenger strand and in severe cases may result in damage to the relatively fragile coaxial cables.

In many cases it will be desirable to guide the cables into position beneath the messenger strand at a point where the messenger is attached to a supporting pole. In other instances a particular job may demand or at least render desirable the guiding of the cables into position beneath the strand at a point intermediate the supporting poles.

Thus it will be seen that there is a need for a cable guide which can handle several, relatively fragile cables simultaneously without danger of cable damage through inter cable contact, which is capable of being installed either at a pole or intermediate supporting poles, and which can compensate for positioning of the cable reel at points other than at the optimum location of the reel with respect to the messenger strand.

SUMMARY OF THE INVENTION

A cable guide in accordance with the present invention includes a plurality of sets of rollers designed to handle simultaneously but separately a plurality of cables and guide the cables smoothly and without severe bending into a position beneath a messenger strand at a point either adjacent a supporting pole or intermediate supporting poles.

Thus, in accordance with one preferred embodiment of the invention a conventional pole bracket of, for example, the type disclosed in U.S. Pat. No. 3,110,479, may be modified to permit automatic self-alignment of a guide supported on the bracket in directions about both horizontal and vertical axes. Additionally, the guide includes a roller frame which is adapted to support several sets of coaxially mounted cable supporting rollers with the axes for each of the sets extending in spaced parallel relationship to each other along a generally arcuate path.

In another preferred embodiment of the invention the cable guide is adapted to be attached to a messenger strand at a point between two supporting poles while still providing the features of automatic adjustment of the roller frames in directions about both horizontal and vertical axes as well as providing separate rollers for separate yet simultaneous guiding of the cables into position beneath the messenger strand.

Thus, with regard to the pole mounted embodiment of the present invention, an existing pole mounted base frame having an upstanding support rod can be utilized, provided with a collar in accordance with the present invention, rotatably received on the supporting rod and having a pivot pin projecting substantially perpendicularly from the collar.

A roller frame is pivotally mounted on the pivot pin to permit automatic positioning of the roller frame about a horizontal axis while the rotatable mounting of the collar on the supporting rod provides automatic positioning with respect to a vertical axis. Unlike conventional roller frames, rather than utilizing a series of relatively large rollers, a plurality of sets of coaxially mounted rollers are carried by the roller frame with each roller in each set receiving a single cable during the cable stringing operation.

The strand mounted embodiment of the invention is similar to that described immediately above in that individual rollers are provided on the roller frame for each of a plurality of cables being strung simultaneously and the roller frame is mounted for automatic adjustment about both vertical and horizontal axes. However, in the strand mounted embodiment of the present invention a framework is provided which may be quickly clamped to a messenger strand at any point along its length. This framework includes a downwardly extending supporting rod which rotatably receives one or a plurality of collars, each of which includes a pivot pin designed to pivotally mount a roller frame thereon.

In the strand mounted embodiment of the invention the collars may be readily added or removed from the downwardly projecting supporting rod, and in both embodiments the roller frames may be readily mounted on or removed from their respective pivot pins.

BRIEF DESCRIPTION OF THE DRAWINGS

FIG. 3 is a perspective view of a pole mounted bracket and upstanding support rod associated therewith;

FIG. 4 is another perspective view but showing a collar, pivot pin and associated equipment mounted on an upstanding supporting rod;

FIG. 5 is another perspective view showing a roller frame, including a plurality of sets of rollers, pivotally mounted on a pivot pin;

FIG. 6 is a side view of an adapter in accordance with the present invention;

FIG. 7 is an end view thereof;

FIG. 8 is a cross sectional view through an adapter and roller frame mounted on an upstanding support rod;

FIG. 9 is a view of a roller frame mounted on a pivot pin and showing in phantom lines the limiting of pivoting movement about the pivot pin;

FIG. 10 is a view of the strand mounted chute;

FIG. 11 is a side view of the embodiment of FIG. 10;

FIG. 12 is a view taken on line 12—12 of FIG. 10; and

FIG. 13 is a view similar to FIG. 10 but showing a pair of roller frameworks and rollers mounted on the pivot pins of the cable guide.

DESCRIPTION OF THE PREFERRED EMBODIMENTS

Figure 1:
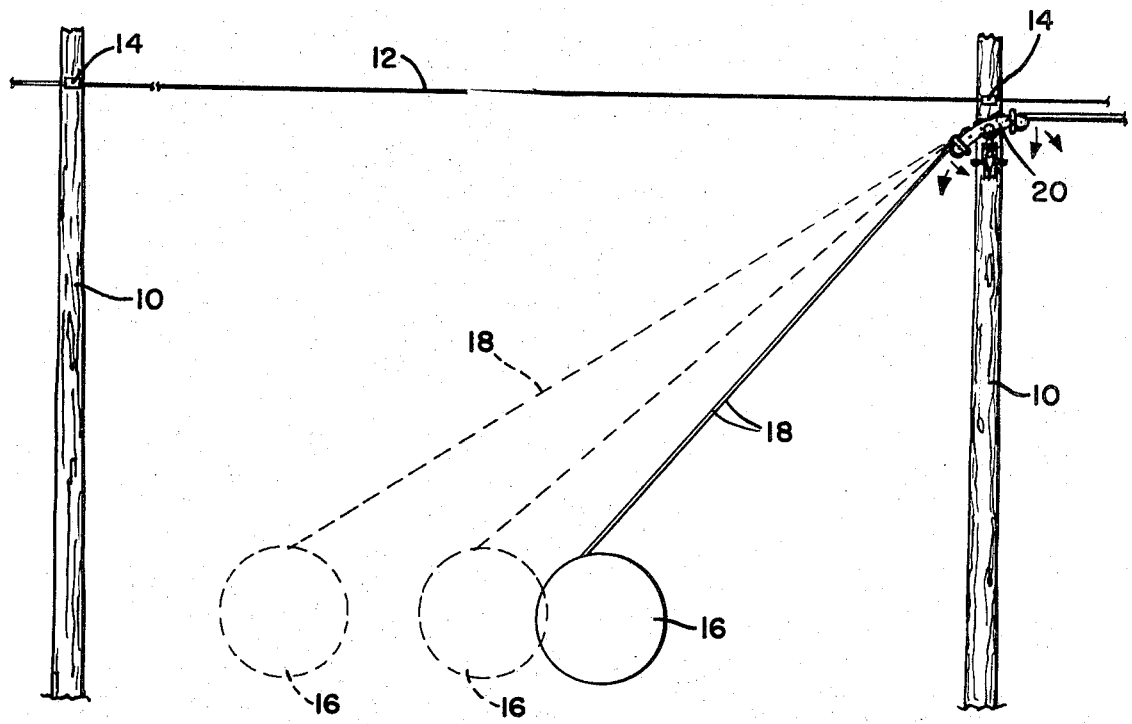
FIG. 1 is an elevational view showing, somewhat schematically, a plurality of cables being guided into position beneath a messenger strand by a pole mounted cable chute.

FIG. 1 of the drawings depicts a typical installation wherein spaced supporting poles 10 support a messenger strand 12 which is clamped to each of the poles, as at 14. When it is desired to suspend cables, such as coaxial cables, from the messenger strand, a reel or reels, indicated schematically at 16, are positioned on the ground, usually carried by a suitable reel support, and the cables 18 are directed upwardly as they are unwrapped from the reel or reels 16 to a position beneath the messenger strand.

In one commonly accepted method of stringing cables a length of cables is temporarily supported beneath the messenger strand and then permanently lashed thereto by a helical lashing of wire. In order to guide the cables into position beneath the messenger strand from the reels 16 suitable guide means are generally provided beneath the messenger strand at the point where the cable stringing operation is to commence.

In accordance with one embodiment of the present invention such guide means takes the form of a chute 20, which not only serves to guide a plurality of cables into position simultaneously, but is also designed to pivot about both vertical and horizontal axes to accommodate positioning of the reel with respect to the messenger strand at other than optimum locations.

Thus, with reference to FIGS. 3 through 9 of the drawings, it will be seen that the cable chute 20 in accordance with the present invention may utilize any suitable base frame, such as that shown in FIG. 3 of the drawings. For purposes of illustration the base frame is shown as including a channel 22 and a portion 24 projecting outwardly therefrom. The base frame is chained to a pole 10 by means of a chain 26 which wraps the pole and is attached to a slide mechanism 28, the chain then being tightened by means of the threaded shaft 30 attached to the slide 28 and the internally threaded nut member 32 having a handle 34. The particular construction of the base frame and means for attaching it to a supporting pole are immaterial as long as a firm mounting is provided for an upstanding supporting rod 36, and such structure may take the form of that shown, for example, in U.S. Pat. No. 3,110,479.

In accordance with the present invention, however, rather than a roller framework being mounted on the supporting rod 36, an adapter 40 is utilized, which includes a collar 42 rotatably received on the supporting rod 36 and a pivot pin 44 projecting outwardly, substantially perpendicularly from the collar 42.

Generally trapezoidally shaped gusset plates 46 are welded to the collar 42 and extend approximately tangentially therefrom and are welded to opposite sides of the pivot pin 44. Additionally, a washer 48 is welded to the pivot pin 44 and gusset plates 46 to act as a spacer in positioning a roller framework received on the pivot pin 44.

Also welded to the gusset plates 46 and washer 48 are a pair of spaced parallel limit pins 50, which also extend parallel to the pivot pin 44 and project outwardly from the collar 42 past the outer surface of the washer 48. The outer end of the pivot pin 44 is apertured to receive a tractor pin 52 and a second washer 54 is slidably received on outer end of the pivot pin 44.

With the adapter 40 mounted on the base frame, as shown in FIGS. 4 and 5 of the drawings, a roller frame 60 may be positioned on the pivot pin 44. Roller frame 60 includes a pair of spaced parallel side plates 62 of generally arcuate configuration carrying a plurality of axles 64 extending therebetween. Each of the axles 64 journals a set of rollers 66 with the cable engaging surfaces of the rollers defining a generally arcuate path.

The roller frame 60 is provided with a socket 68 extending between side plates 62 and pivotally receiving the pivot pin 44, thus allowing pivoting movement of the roller frame about the horizontal axis defined by the pivot pin 44. As a result, and as can be seen with reference to FIG. 1, the cable chute can accommodate positioning of the cable reel at an infinite number of positions, two alternate positions being shown in phantom lines for purposes of illustration.

However, as the angle of attack from the ground to the messenger strand becomes too great, pivoting of the roller frame 60 is limited by engagement of one of the side plates 62 of the frame with one of the limit pins 50, as best seen in FIG. 9 of the drawings.

In addition to providing self-alignment about a horizontal axis over a fairly wide range, the rotatable mounting of the collar 42 on the supporting rod 36 also permits for deviation of the positioning of the cable reel from the optimum position in which the reel is aligned with the messenger strand.

Additionally, by utilizing a plurality of sets of rollers, as best seen in FIGS. 5 and 8, each cable 18 is guided individually without the danger of inter cable contact and resulting damage. In this regard, it will be noted that the sets of rollers 66 can be a plurality of individual rollers, as shown in FIG. 5, or a single roller having a plurality of cable receiving grooves, as seen in FIG. 8.

It will also be noted from FIG. 8 that the grooves receiving the cables may be of different sizes to accommodate cables of different diameters.

With reference now to FIGS. 2 and 10 through 13, a second preferred embodiment of the invention will be described which is particularly adapted for being attached on an existing messenger strand between the strand supporting poles. The strand mounted cable chute 70 includes a base frame having a cross member 72 carrying at each of its ends outwardly projecting portions 74.

Each of the outwardly projecting portions 74, preferably of tubular construction, has attached to its inner end, as by welding, a washer 76. An elongated rod 78, threaded at one end 80 thereof, has its opposite, unthreaded end 82 fixed in the washer 76 by welding. A clamp plate 84 is welded to the outer end of the member 74 and is provided with a strand receiving groove 86 adjacent its lower edge, and an outer clamp plate 88 is loosely received on the threaded portion of the rod 80.

A knob 90 is threadably received on the threaded portion 80 of the rod 78 and a washer 92, which is fixed by welding, and enlarged head 94 prevent the knob 90 from being detached from the rod 78. The outer clamp plate 88 also includes a roll pin 96 which is force fitted into the outer plate 88 and loosely received in an opening (not shown) in the inner clamp plate 84.

Depending downwardly from the base frame medially of the cross member 72 is a downwardly depending supporting rod 98 rotatably receiving one or more collars 42 of adapters 40. Each of the adapters 40 may be of the same construction shown in FIGS. 6 and 7 of the drawings and the length of the support rod 98 may be varied to accommodate as many of the adapters 40 as desired. Preferably, adjacent collars are separated by tubular spacer sleeves 100 slipped over the supporting rod 98 as seen in FIGS. 10, 11 and 13 of the drawings.

Each of the pivot pins 44 of the adapters 40 may receive a roller frame 60 in the same manner as described with respect to the previous embodiment of the invention and as seen particularly in FIG. 13 of the drawings. With this construction, it will be noted that the strand mounted cable chute can be positioned at any point along the messenger strand, including, if desired, at a pole 10.

Figure 2:
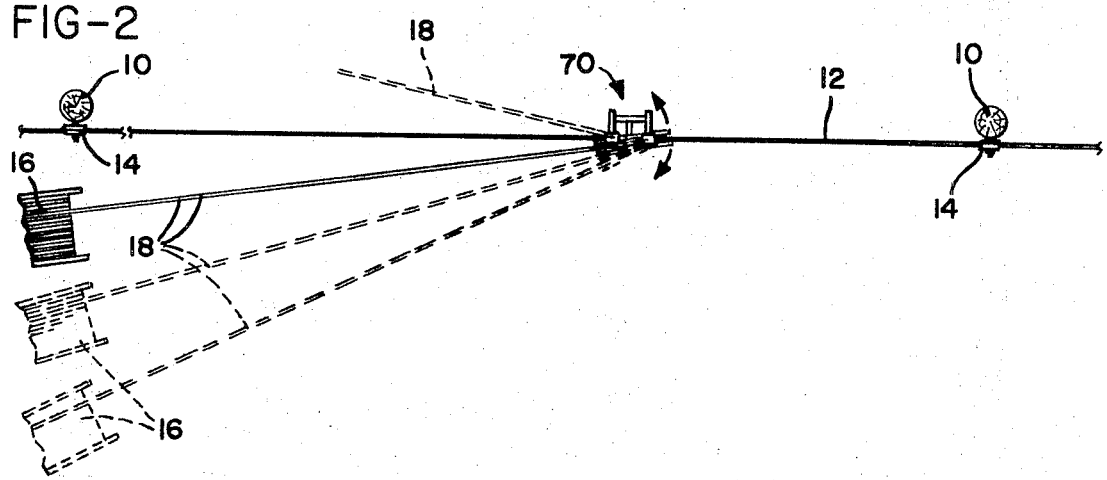
FIG. 2 is a top plan view showing a plurality of cables being guided into position beneath a messenger strand by a strand mounted cable chute.

For purposes of illustration the strand mounted chute is shown in FIG. 2 as mounted intermediate a pair of poles 10 and it will be particularly noted from this figure that the rotatable mounting of the collars 42 on the support rod 98 permits the cable reel 16 to be positioned at an infinite number of angular positions with respect to the messenger strand 12.

Of course, the same type of misalignment illustrated in phantom lines in FIG. 1 of the drawings with regard to the cable chute 20 may be accommodated by the strand mounted cable chute 70. Thus, the pivot pins 44 provided for pivoting action of the roller frames 60, with excess pivoting of the roller frames being limited by the limit pins 50 projecting outwardly at opposite sides of the pivot pins 44.

Additionally, the same type of connection used to retain the roller frame 60 on the pivot pins 44 may be utilized to retain the adapters 40 on the supporting rod 98, as best seen in FIGS. 10, 11 and 13 of the drawings. Specifically the lower end of the supporting rod 98 may be drilled to receive a tractor pin 102 and a washer 104 may be slipped onto the supporting rod to engage the lower edge of the lowermost collar 42. Of course, each of the frames 60 includes a plurality of sets of rollers so that a plurality of cables may be guided into position simultaneously although independently of each other.

From the above it will be seen that the present invention provides a cable chute adapted to be mounted either at a pole or at any point along a messenger strand and which provides individual handling of each of the cables while permitting self-alignment of the cable chute about mutually perpendicular horizontal and vertical axes.

While the forms of apparatus herein described constitute preferred embodiments of the invention, it is to be understood that the invention is not limited to these precise forms of apparatus, and that changes may be made therein without departing from the scope of the invention.

What is claimed is:

1. A cable chute comprising:
   a. a base frame,
   b. a supporting rod fixed to and projecting from said base frame,
   c. means for mounting said base frame on an existing member with said supporting rod projecting substantially vertically from said base frame,
   d. collar means rotatably received on said supporting rod,
   e. a pivot pin projecting substantially perpendicularly from said collar means and capable of rotational movement about an axis coincident with the axis of said supporting rod,
   f. a roller frame,
   g. means pivotally mounting said roller frame on said pivot pin for pivotal movement about the longitudinal axis of said pivot pin, and
   h. a plurality of rollers rotatably mounted on said roller frame with the axes of said rollers extending in substantially parallel relationship to said axis of said pivot pin and the cable engaging surfaces of said rollers defining a generally arcuate path curving about a center extending parallel to said pivot pin.

2. The cable chute of claim 1 further comprising:
   a. gusset means for reenforcing said chute extending between and fixed to said collar means and said pivot pin.

3. The cable chute of claim 1 further comprising:
   a. limit means projecting outwardly of said collar means for limiting pivoting of said roller frame on said pivot pin.

4. The cable chute of claim 1 further comprising:
   a. means for retaining said collar means on said supporting rod.

5. The cable chute of claim 1 further comprising:
   a. means mounted on said pivot pin adjacent said collar means for engaging and positioning a face of said roller frame in spaced relation to said collar means.

6. The cable chute of claim 1 wherein:
   a. said plurality of rollers includes a plurality of sets of coaxially mounted rollers with the axes of said sets disposed in spaced parallel relationship to each other.

7. In a cable chute comprising a base frame, means for mounting said base frame on a pole, an upstanding supporting rod extending from said base frame, and a roller frame rotatably mounting a plurality of rollers with the cable engaging faces of said rollers defining an arcuate path, the improvement comprising:
  a. a collar rotatably received on said supporting rod,
  b. a pivot pin attached to said collar medially thereof and extending substantially perpendicularly therefrom,
  c. a pair of substantially trapezoidally shaped gusset plates attached to and extending substantially tangentially from said collar to said pivot pin,
  d. a washer mounted on said pivot pin adjacent said collar and fixed to said pivot pin and portions of said gusset plates,
  e. a pair of limit rods attached to outer surfaces of said gusset plates and projecting outwardly away from said collar in spaced parallel relationship to said pivot pin and beyond said washer fixed to said pivot pin,
  f. said roller frame being pivotally received on said pivot pin,
  g. said plurality of rollers including a plurality of sets of rollers coaxially mounted on said roller frame with the axes of said sets disposed in spaced parallel relationship to each other along a generally arcuate path, and
  h. means on an outer end of said pivot pin for retaining said roller frame pivotally mounted thereon.

8. The cable chute of claim 1 wherein:
  a. said base frame includes means for clamping said cable chute to a messenger strand.

9. The cable chute of claim 1 wherein:
  a. said supporting rod comprises an elongated rod depending from said base frame.

10. The cable chute of claim 9 wherein:
  a. said supporting rod is greater than twice the length of said collar means, and
  b. said collar means includes a plurality of collars rotatably received on said supporting rod.

11. The cable chute of claim 10 further comprising:
  a. spacer means received on said supporting rod intermediate said collars.

12. The cable chute of claim 1 wherein:
  a. said base frame includes a cross bar adapted to be positioned beneath and substantially parallel to a messenger strand, and
  b. clamp means is provided mounted adjacent opposite ends of said cross bar and adapted to be clamped to a messenger strand.

13. A cable chute comprising:
  a. an elongated cross bar,
  b. means mounted adjacent opposite ends of said cross bar for clampingly engaging a messenger strand,
  c. an elongated supporting rod attached to and extending downwardly substantially perpendicularly from said cross bar medially thereof,
  d. gusset means extending between and attached to said cross bar and said supporting rod,
  e. a plurality of collars rotatably received on said supporting rod,
  f. spacer means rotatably received on said supporting rod intermediate adjacent collars,
  g. pivot pins attached to and extending substantially perpendicularly from each of said collars,
  h. gusset plates attached to and extending between said collars and their respective pivot pins,
  i. limit rods attached to outer surfaces of said gusset plates and extending in spaced parallel relationship to said pivot pins,
  j. roller frames pivotally mounted on said pivot pins,
  k. each of said roller frames including a plurality of sets of coaxially mounted rollers with the axes of said rollers extending in spaced parallel relationship to each other and positioned along an arcuate path convexly curved toward said cross bar,
  l. means for retaining said roller frames on their respective pivot pins, and
  m. means for retaining said collars on said supporting rod.

* * * * *